W. IRONSIDE.
Seed-Planter.
No. 43,995. Patented Aug 30, 1864.
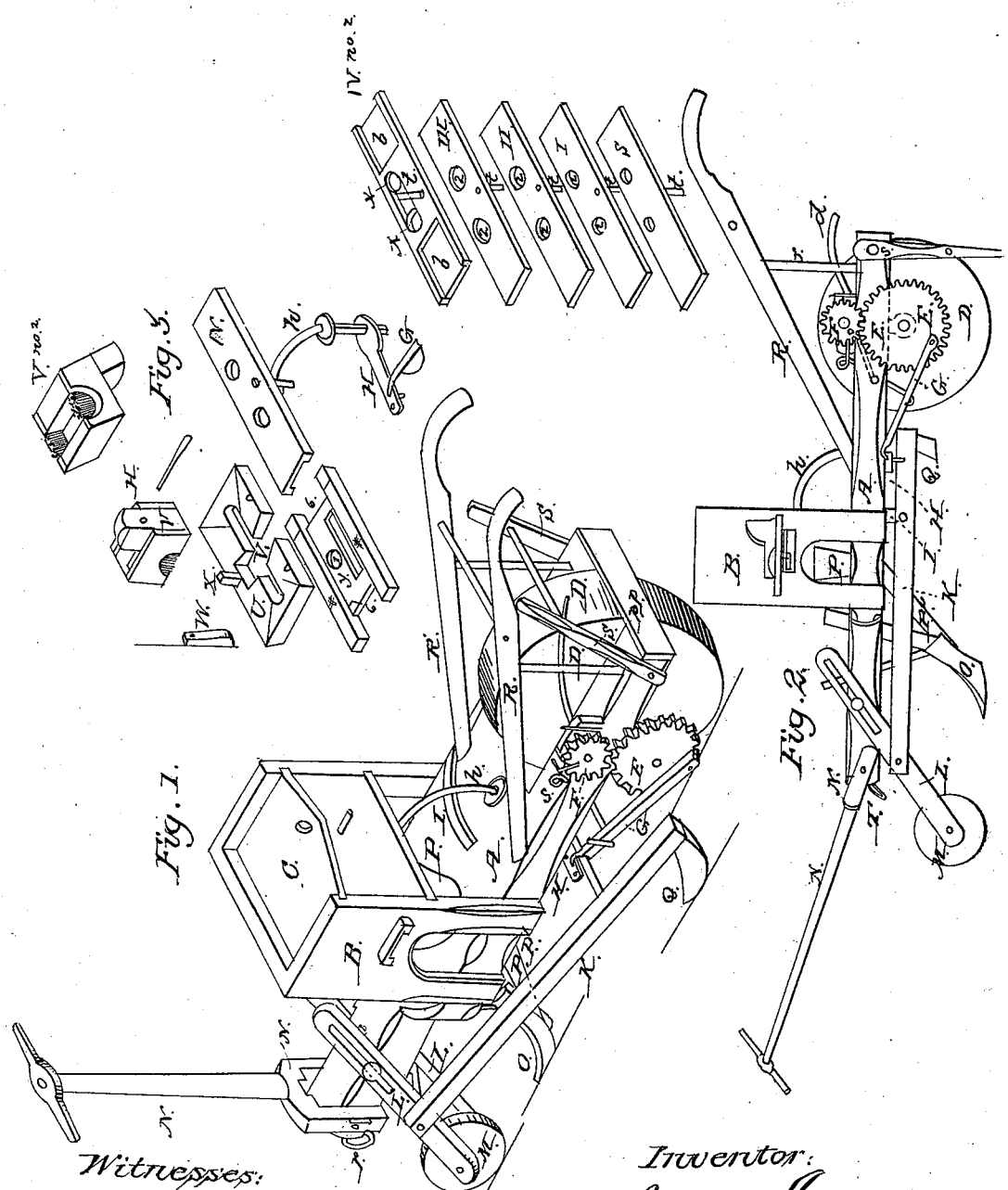

UNITED STATES PATENT OFFICE.

WILLIAM IRONSIDE, OF JENNERSVILLE, PENNSYLVANIA.

COMBINED SEEDER AND CULTIVATOR.

Specification forming part of Letters Patent No. 43,995, dated August 16, 1864.

*To all whom it may concern:*

Be it known that I, WILLIAM IRONSIDE, of Jennersville, in the county of Chester and State of Pennsylvania, have invented a new and Improved Combination in the Construction of a Combined Drill and Cultivator; and I do hereby declare that the following is a full and exact description thereof, reference being had to the accompanying drawings, and to the letters of reference marked thereon, making a part of this specification, in which—

Figure 1 is a perspective view; Fig. 2, a longitudinal elevation; Fig. 3, the several parts within the box or hopper B detached, together with the several slides S, I, II, III, and IV; also IV, No. 2, under side of IV, as is V, No. 2, under side of brush-block.

The nature of my improvement consists in its application for planting Indian corn, varying the dropping in hills of two, three, or four grains in each, separated at any distance apart from eleven inches to thirty-six inches, and for planting broom-corn or sorghum, adapted either for hand or horse power, covering the same and rolling, completing all in one operation. The machine is equally well adapted for planting beans.

To enable others skilled in the art to make and use the same, I will proceed to describe its construction and operation.

The central portion of the supporting-frame A is straddled by the seeding-box B, under which is the receiving funnel P of the tube P', which conveys the seed behind the furrowing boot or shovel O to the soil. The machine is narrowed in front for the tongue N for hand-power or ring $r$ for horse-power, supported by the guiding-pulley M, held between two oblique-slotted supports, L, which admit adjusting the depth of the shovel or boot O in the soil for the furrow. The top A is carried back on both sides, leaving an open space for the roller D, held between those sides in proper boxes or supports for the axle of the same. There are also two arms, K, affixed on each side by a pivot or pin passing through the inclined supports L of the guiding-pulley M. These arms are joined by a cross-piece, and each supports a covering shovel or cultivator at its terminus for covering the furrow or seeds dropped into the furrow made by the boot O. There is a strap, I, or its equivalent for raising the shovel-arms K from the ground and holding them there. Fig. 1 shows the shovels down. Fig. 2 shows them raised up by means of the strap I. The handles R R' are of the ordinary kind in use.

To guard against easily overturning the machine when not in use, a pair of legs, S, held by pivots on the outside of the extended sides or arms of A, are affixed, which can be turned up, as shown in Fig. 1.

The axle of the roller D is supported in a proper box under the arms A. To this axle there is a cogged wheel, E, which drives the loose and changeable pinion F, held in its place by a spring or clutch, $s$. These pinions may be of various sizes, on which is a crank-pin for the connecting-rod G, which operates the lever H of the bent rocker $h$, with its forked end embracing the peg $t$ on the slide extending through a slot, $z\ z$, in the bottom of the box B. The smaller the pinion the faster the motion of the seeding-slide. There is also a crank-pin on the larger cogged wheel, which imparts a single motion to each revolution of the roller D, and may be used for planting in hills three feet apart. There is also a lever or bent arm, $d$, on a pivot affixed to the frame for the purpose of unshipping the hook of the connecting-rod and holding it as it slides to and fro thereon without operating the rocker. This is not shown in the drawings, nor is it novel. The two extended arms of A are united close behind the roller by an iron scraper, $p\ p$, for the purpose of scraping off the soil when clogged or to prevent clogging. The interior arrangement of the parts in the box consists, first, of a bottom having raised sides $\cancel{y}$, with a lower central part, $y$, in which the slide moves. This central portion is open for the discharge of chaff, offal, &c., on each side within the box. There is also an opening on each side of the box, through which the ends of the slide alternately protrude in its motion to and fro while seeding. Over this bottom and contained slide there is a false hopper-shaped bottom, U, having a longitudinal slot for the seed and a central open space, V', for the reception of the brush-block V, under which the side moves in contact with the two rows of bristles in the block. This false bottom can easily be taken out by turning the catch W on the inside of the box, which locks against the upright X on the false bottom, and slipped from under two side pegs on the side opposite. The brush is also kept in place by a pin entering into the block through the outside of the box. The slide IV illustrates the upper side and end of all the slides used, and IV, No. 2, the under side, $t$, the central portion of equal thickness, the sunken space between the two drop-holes $z$. The outer third part is also centrally sunken, (shown by $b$.) This structure of the slide prevents clogging in their motion to and fro, discharging all lodged impurities through the openings on the sides of the bottom, outside the receiving funnel or hopper P, into which latter the seeds, passing alternately through the openings $z'$ in the slide through the opening $z$ in the bottom $y$, drop, regulated by the motion of the rocker, aided by the action of the brush-block. The spout conveying the seed into the furrow made by the shovel or boot O, and covered by the side scrapers, Q, and action of the roller D, requires no explanation.

The whole combination makes this a valuable and desirable machine for the agriculturalist.

I am aware that seeders having guide-pulleys and slotted supports and rollers with cogs upon them are not new, either with perforated revolving disk for seeding or plain simple slides, variously combining the general features for diversified purposes. I therefore do not claim such as my invention. But I am not aware that side scrapers on arms attached to the pulley-supports have been used in the manner shown for raising and lowering the same; nor am I aware that a cogged wheel and changeable pinions, operating as set forth, have been used in the manner specified for moving the slides.

The slides vary for the different objects in the size of the seeding-apertures $z$, the one marked S for sorghum, I for broom-corn, No. S II III IV for Indian corn, varying from two, three, to four grains of corn or beans to each hill, the distance between the hills regulated by the size of the pinion F or crank-pin on the wheel E, with or without an adjustable connecting-rod.

What I claim as my invention is—

1. The arrangement of a single guide-pulley, M, and slotted side supports, L, when combined with vibrating arms K for the covering-scrapers Q, and means of raising them from the ground by a strap, I, and securing them, or its equivalent, substantially in the manner and for the purpose specified.

2. The construction of the slide IV, Fig. IV No. 2, with the ends on the under side centrally chambered, open on the outer edge, $b$, operated in a sunken portion, $y$, of the centrally open-ended bottom, with its slot $z z$, by the combined action of the forked rocker $h$, its arm H, and the connecting-rod C, pinion F, and spur-wheel E, all operated by the roller D, when arranged, as shown for the purpose specified.

3. The loose or false hopper-bottom U, with its upright X, long slot and central opening, V', in combination with the brush-block V, all covering the vibrating slide IV, secured and arranged in the manner specified.

WILLIAM IRONSIDE.

Witnesses:
 CHAS. R. FRAILEY,
 JACOB STAUFFER.